United States Patent [19]

Burgess et al.

[11] 4,384,475
[45] May 24, 1983

[54] LOCATION OF LEAKS IN OIL-FILLED CABLES

[75] Inventors: Vincent Burgess, Gwernymynydd, Wales; John R. Brailsford, Farndon, Nr. Chester, England

[73] Assignee: The Electricity Council, London, England

[21] Appl. No.: 198,027

[22] Filed: Oct. 17, 1980

[30] Foreign Application Priority Data

Oct. 18, 1979 [GB] United Kingdom ............... 7936244

[51] Int. Cl.³ .............................................. G01M 3/28
[52] U.S. Cl. ................................. 73/40.5 R; 73/49.1
[58] Field of Search ...................... 73/40.5 R, 40, 49.1

[56] References Cited

U.S. PATENT DOCUMENTS 3,508,431  4/1970  Richardson et al. ............... 73/4 D
3,702,074 11/1972  Mullen ............................. 73/40.5 R

FOREIGN PATENT DOCUMENTS 738587   7/1943  Fed. Rep. of Germany ... 73/40.5 R
1120761  2/1960  Fed. Rep. of Germany ... 73/40.5 R
1515609  7/1969  Fed. Rep. of Germany ... 73/40.5 R
2609717  9/1977  Fed. Rep. of Germany ... 73/40.5 R
43-29061 12/1968 Japan ................................. 73/49.1
55-115700 9/1980 Japan ............................. 73/40.5 R
361183  11/1931 United Kingdom ........... 73/40.5 R

*Primary Examiner*—Daniel M. Yasich
*Attorney, Agent, or Firm*—Beveridge, DeGrandi & Kline

[57] ABSTRACT

To locate a leak in a length of pressure-assisted oil-filled electric power cable, the static fluid pressure is measured at the two ends of the length and the flow into or out of the cable is measured at one end for at least two different pressure supply conditions giving different flow rates while maintaining zero flow rate at the other end of the cable. The measurements are then repeated with zero measured flow rate at said other end. From these measurements, the relationship between flow rate at each end of the cable and the pressure drop between the ends due to flow can be determined and this enables the position of the leak to be calculated. Apparatus for making the necessary measurements is described.

3 Claims, 4 Drawing Figures

LOCATION OF LEAKS IN OIL-FILLED CABLES

BACKGROUND OF THE INVENTION

1. Field of the Invention

This invention relates to the location of leaks in pressure-assisted oil-filled electric power cables.

2. Prior Art

Oil-filled electric power cables are liable to develop leaks, particularly at cable joints. Since such cables are commonly underground, the location of such leaks presents problems. The most common method of leak location employed at present requires sectionalising the cable by repeated excavation and freezing of the cable. This is a time-consuming and expensive procedure.

In a Paper by O. Nigol in IEEE Transactions on Power Apparatus and Systems, Vol. PAS-89, No. 7, September/October 1970, there is described a hydraulic method for determining the location of oil leaks in underground cables. This method requires the presence of a sound cable alongside the leaky cable. At one end of the cable, arrangements are made to connect the leaky cable and sound cable. The oil passage in the two cables are then fed from a common reservoir or reservoirs at one end of the cable system. The oil flows in the two cables are measured. If these flows in the leaky and sound cables are $Q_1$ and $Q_2$ respectively, then the distance of the leak from the measuring terminal, as a fraction of the total cable length, is given by the ratio of $2Q_2$ to $Q_1 + Q_2$. Such a technique however requires that there should be a sound cable without any leaks and that it should be known that there are no leaks on the sound cable.

BRIEF SUMMARY OF THE INVENTION

It is an object of the present invention to provide an improved method of and apparatus for determining the location of oil leaks which does not require the use of a parallel sound cable. This makes it possible therefore to utilise the present invention on a three-core single cable installation.

According to one aspect of the present invention, a method of locating an oil leak in a length of a pressure-assisted oil-filled electric power cable comprises the steps of measuring the static fluid pressures at the two ends of a length of cable and measuring the flow into or out of the cable at one end for at least two different pressure supply conditions giving different flow rates whilst maintaining a predetermined flow rate, which may be zero, at the other end of the cable and either repeating the measurements with a different measured flow rate at said other end or alternatively making the measurements at said other end for a predetermined flow rate at the first end whereby the relationship between flow rate at each end of the cable and the pressure drop between the ends of the cable due to flow can be determined thereby enabling the position of the leak to be calculated.

If it is possible to supply oil to the cable at each end of the cable, then it is convenient to make measurements of flow rate into the cable and pressure difference for flows into the cable at each end whilst having zero flow rate at the other end. If measurements are made at the two ends in this way, the ratio of the pressure difference to flow at one end for zero flow at the other end bears to the relationship of the pressure difference at the other end to flow rate at the other end for zero flow at the first end, is the same ratio as that between the distance from said one end to the leak and the distance from said other end to the leak. Since there is a substantially linear relationship between pressure difference and flow, it may be sufficient to take two measurements of pressure difference and flow at each end with zero flow at the other end but more usually measurements would be made at several different pressure steps. It will be understood that zero flow is readily obtainable. In many cases the cable is only fed at one end when in service and is already blanked off at the other end. By such measurements, the relationship between head and flow rate may thus readily be determined for each end.

It may be more convenient in some cases to provide oil feed to make all the measurements at only one end, then at the other end it is necessary to make measurements of the relationship of the pressure difference between the ends of the cable to flow rate into the cable at said one end for at least two different known flow rate conditions at the other end, one of which most conveniently is zero. Although it may be simpler and quicker to use this technique in that oil supply is required only to one end of the cable for measurements, this technique requires the provision, at the other end, of some means permitting a predetermined flow rate out of the cable.

The invention furthermore includes within its scope apparatus for locating an oil leak in a length of pressure-assisted oil-filled electric power cable comprising, at each end of the length of cable, static pressure measuring means arranged for measuring fluid pressure in the cable and means at each end of the cable for measuring flow into or out of the cable.

Further features of the invention will be apparent from the following description of two techniques for locating an oil leakage in electric power cables. In this description, reference will be made to the accompanying drawings.

BRIEF DECRIPTION OF THE DRAWINGS

DESCRIPTION OF THE PREFERRED EMBODIMENTS

Figure 1:
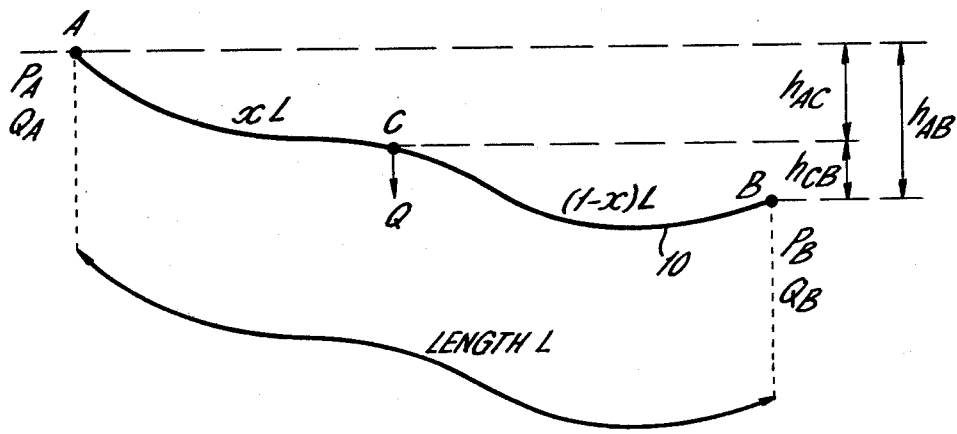
FIG. 1 is an explanatory diagram illustrating a length of cable with a leak intermediate the ends, the diagram showing the changes in elevation of the cable along its length.

FIG. 1 illustrates diagrammatically at 10 a length of pressure-assisted oil-filled power cable extending between two points A and B; the diagram illustrates the variations in height, above a datum, of the cable along its length. It is assumed that there is a leak at a point C which is at a height $h_{AC}$ below A and a height $h_{CB}$ above B. The point A is at a height $h_{AB}$ above B. Such a power cable would normally be kept supplied with oil at a pressure in the range 1 to 5 bar by means of reservoir tanks which are designed to maintain practically constant pressure while being able to accommodate the variations in volume of oil in the cable caused by expansion or contraction due to temperature changes in the cable. The cable construction is such that there is little restriction to oil flow by the provision of oil ducts within the cable. Similarly the cable joints are designed to offer minimum restriction to the oil flow. This ensures that no section of a cable suffers a loss of oil pressure due to oil flow caused by thermal changes or by a leak.

The theoretical pressure drop ($\Delta^p$) due to an oil flow of Q liter per second along a length of cable L meters is:

$$\Delta^p = QRL \, 10^{-2} \text{ bar} \quad (1)$$

where R is the frictional resistance to flow of oil in the cable per meter.

For circular ducts or pipes:

$$R = \frac{2.5\eta \times 10^3}{r^4} \text{ MN s/m}^6 \quad (2)$$

where
$\eta$ = oil viscosity (centipoise) at the test temperature.
r = internal radius (mm) of the pipe or duct.
(For three core cables with three ducts in the cable the value of R is reduced by a factor of 3).

This analysis assumes that R is uniform along the cable length and ignores the effects of joints. Experimental work has established that this is a satisfactory approximation.

Considering firstly a method of leak location in which oil feed is available at both ends of the cable and assuming that the leak point C is at a distance xL from A, if the pressures at A and B, ($P_A$, $P_B$) and the rate of oil flowing into the cable at A, ($Q_A$) are measured, then at steady conditions, the pressure drop between A and C, from (1) is given by:

$$P_A - P_C = Q_A.R.xL + \gamma h_{AC} \quad (3)$$

where $\gamma$ is the constant defining the relationship between the units of pressure and the units of head.

A first measurement is made with no oil flow at the end B. Since there is no oil flow between C and B, the pressure drop between the two points is caused only by the difference in head.

$$P_C - P_B = \gamma h_{CB} \quad (4)$$

Adding (3) and (4) gives $$P_A - P_B = Q_A.R.xL + \gamma h_{AB} \quad (5)$$

Figure 2:
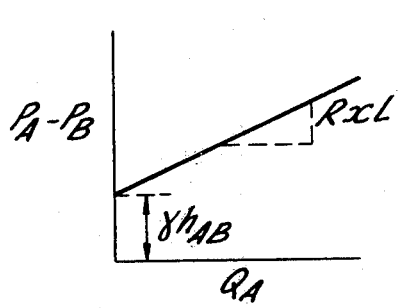
FIGS. 2 and 3 are graphical diagrams used in explaining the manner of determining the position of a leak.

If the pressure supply at A is varied in steps, and conditions allowed to stabilise at each value of $P_A$, then a straight line plot of $P_A - P_B$ against $Q_A$ is obtained, from which the values of R.xL and $\gamma h_{AB}$ can be determined as shown in FIG. 2. This figure is a graph showing the relationship between $P_A - P_B$ as ordinate and $Q_A$ as abscissa; the slope of the straight line graph is R.xL and the intercept on the Y axis for $Q_A = 0$ is the value of $\gamma h_{AB}$.

If the pressure supply position is now changed to B, and the procedure repeated with the flow rate $Q_B$ being measured, a similar equation to equation 5 may be obtained:

$$P_B - P_A = Q_3.R(l-x)L - \gamma h_{AB} \quad (6)$$

Figure 3:
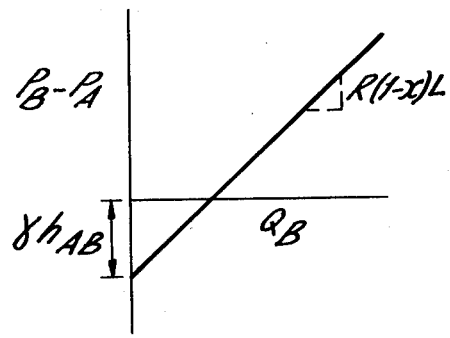

As seen from FIG. 3, the value of R.(1−x)L can now be found and the intercept value of $\gamma h_{AB}$ provides a check on the measurements. Since R.xL and R.(1−x)L are known, x may be predicted from:

$$x = \frac{R \cdot xL}{R \cdot xL + R \cdot (1-x)L}$$

It will be immediately apparent from FIGS. 2 and 3 that the interpretation of the results is simplest when there is no flow in or out from the far end of the cable, that is the end remote from where the flow measurements are made. This also simplifies the carrying out of the test since zero flow can readily be obtained. It will be obvious however that the leakage point C could be determined if the tests were made with a predetermined flow other than zero from the far end of the cable.

The technique described above requires an oil feed at each end of the cable. It is possible however to use a method in which the oil feed supply is at one end only of the length of cable. Referring to FIG. 1, the leak at C may be fed from a tank at A only, the rate of outflow at B being measured. At each pressure step two measurements are made, one with the tank feeding the leak only (as above) and one where oil is deliberately bled from the end B at a known rate ($Q_{BLEED}$). Using the same notation as above, the equations for these two cases are:

No bleed $(P_A - P_B)_1 = Q_{A1}.R.xL + \gamma h_{AB}$ (7)

with bleed
$(P_A - P_B)_2 = Q_{A2}.R.xL + Q_{BLEED}.R.L + \gamma h_{AB}$ (8)

Plotting equation (7) at each pressure step (i.e. all results where $Q_{BLEED} = 0$) gives a graph with:
(slope)$_1$ = R.xL.
intercept = $\gamma h_{AB}$
Re-writing equation (8):

$$(P_A - P_B)_2 - Q_{A2}.R.xL = Q_{BLEED}LR + \gamma h_{AB}$$

Plotting $(P_A - P_B)_2 - Q_{A2}.RxL$ against $Q_{BLEED}$ gives a graph where:
(slope)$_2$ = LR
intercept = $\gamma h_{AB}$ $$\text{Thus } x = \frac{(\text{slope})_1}{(\text{slope})_2}$$

Both methods are subject to errors due to pressure and flow variations caused by temperature changes, variations in oil viscosity due to temperature changes or different grades of oil being present in the different sections of the same cable.

In making the measurements, any equipment used must not only be sufficiently accurate but also must be rugged enough for everyday field use and must not contaminate the cable oil, since this is a high purity insulating oil, and also must be such that there is no chance of allowing gas and air in contact with the oil, since this oil is de-gassed with a vacuum pump before being introduced into the cable.

When the repair of a leaking oil cable becomes desirable the oil leak rate is commonly in the range 1–50 ml/min. It is necessary in practice to measure this flow rate to an accuracy of at least 0.1 ml/min. One suitable form of flowmeter consists of a length of small bore pipe, wound into a coil, through which the oil passes. A differential pressure transducer is used to measure the pressure drop across the length of pipe. This flowmeter is calibrated using oils of known viscosities and curves plotted for variations in temperature.

The pressure drop due to oil flow ($P_A - P_B$) may be very small compared to the static oil pressure maintained in the cable and also the two pressures $P_A$ and $P_B$ must be measured by independent measurement systems at the two ends of the cable. The value of $P_A - P_B$ is dependent on the oil leak rate, the fluid resistance of the cable ducts and the length of cable involved and so in general will be different for each cable installation.

Figure 4:
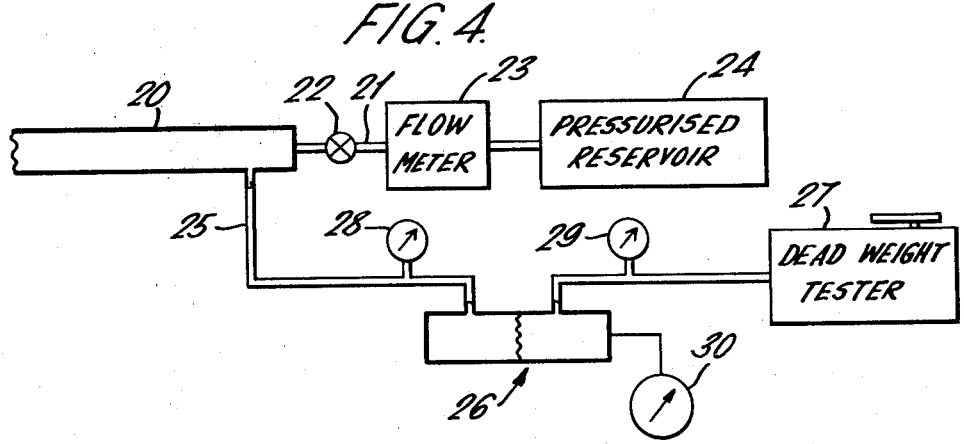
FIG. 4 is a diagram illustrating a method of and apparatus for pressure measurement for carrying out the invention at one end of a length of cable with a leak intermediate its ends. Said apparatus is provided at each end of the length of cable to be tested.

As discussed hereinabove, the end of the apparatus for carrying out the above-described method shown is permanently illustrated in FIG. 4. As shown in FIG. 4, the cable 20 is connected by a cable feed pipe 21 via a stop valve 22 and a flowmeter 23 to a pressurised oil reservoir 24. For pressure measurement, a connection 25 from the cable or the cable feed pipe at the required measurement point leads into one chamber of a differential pressure transducer 26, the other chamber being supplied from a dead weight tester 27. This dead weight tester is a conventional primary standard for hydraulic pressure measurements. Two Bourdon tube gauges 28, 29 are provided to indicate when the difference between the cable pressure and dead weight tester is in the range of the differential transducer which is typically 0–1 psi. The cable pressure is the sum of pressures indicated by the dead weight tester and the reading on the differential transducer on an indicator 30. By this arrangement for pressure measurement, it has been found possible to obtain repeatable and stable measurements to an accuracy of 1 part in 50,000; this is normally sufficient for the practical location of oil leaks in cables.

The equipment such as is shown in FIG. 4 is provided at each end of the length of cable to be tested. For simplicity, in FIG. 4 there is shown only one end of the cable and the equipment at that end.

We claim:

1. A method of obtaining data for locating an oil leak in a length of pressure-assisted oil-filled electric power cable without using a second sound cable comprising the steps of measuring the static fluid pressure at the two ends of said length of cable and measuring the flow into the cable at one of said ends for at least two different pressure supply conditions giving different flow rates whilst maintaining a predetermined flow rate at the other of said ends of the cable and wherein the static fluid pressure is measured at each of said ends of the cable between the cable and a shut-off valve for shutting off the cable from a fluid feed source, the pressure measurements being made firstly with the valve at a first of said ends closed to give zero flow at that end and flow rate measured at the the second of said ends, and secondly with the valve closed at said second of said ends and the flow rate measured at said first of said ends, determining the relationship between the flow rate at each of said ends of the cable and the pressure drop between said ends of the cable due to flow, and calculating the position of said oil leak from the measurements thus obtained.

2. A method as claimed in claim 1 wherein the static pressure difference between the two ends of the cable is measured for the at least two different flow rates into the cable at a first end of the cable while the flow rate into the cable at the second end is maintained at zero by closing the shut-off valve at the second end, and then the static pressure difference between the two ends of the cable is measured for the at least two different flow rates into the cable at the second end while the flow rate into the cable at the first end is maintained at zero by closing the shut-off valve at the first end.

3. Apparatus for locating an oil leak in a length of pressure-assisted oil-filled electric power cable comprising, at the two ends of the length of cable, static pressure measuring means arranged for measuring fluid pressure in the cable and means at said two ends of the cable for measuring flow into the cable wherein, at each of said two ends of the cable, there is provided a fluid feed reservoir for feeding fluid into the cable and a shut-off valve between the cable and the fluid feed reservoir, wherein the pressure measuring means at said two ends of the cable comprise a differential pressure transducer, a dead weight tester arranged for applying a known pressure to the differential pressure transducer and connecting means forming a pressure connection between the fluid in the cable and the differential pressure transducer and are arranged to measure the static pressure between the shut-off valve and the cable and wherein the flow measuring means at each of said two ends of the cable is between the fluid feed reservoir and the shut-off valve, wherein the measurements obtained are used to calculate the position of said oil leak.

* * * * *